(12) United States Patent
Sun et al.

(10) Patent No.: US 11,398,744 B2
(45) Date of Patent: Jul. 26, 2022

(54) CHARGING METHOD AND DEVICE, ELECTRONIC DEVICE AND STORAGE MEDIUM

(71) Applicant: Beijing Xiaomi Mobile Software Co., Ltd., Beijing (CN)

(72) Inventors: Changyu Sun, Beijing (CN); Jie Fan, Beijing (CN); Zhenfei Lei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 140 days.

(21) Appl. No.: 16/894,059

(22) Filed: Jun. 5, 2020

(65) Prior Publication Data

US 2021/0218263 A1    Jul. 15, 2021

(30) Foreign Application Priority Data

Jan. 14, 2020   (CN) .......................... 202010038028.X

(51) Int. Cl.
*H02J 7/04* (2006.01)
*H02J 7/00* (2006.01)

(52) U.S. Cl.
CPC .. *H02J 7/007192* (2020.01); *H02J 7/007182* (2020.01)

(58) Field of Classification Search
None
See application file for complete search history.

(56) References Cited

U.S. PATENT DOCUMENTS

| 8,907,631 B1 * | 12/2014 | Gurries ................. H02J 7/0077 320/138 |
| 2007/0216349 A1 | 9/2007 | Sakaue et al. |
| 2010/0194351 A1 | 8/2010 | Nagashima et al. |
| 2015/0077058 A1 | 3/2015 | Jung et al. |

(Continued)

FOREIGN PATENT DOCUMENTS

| CN | 104347896 A | 2/2015 |
| CN | 106655407 A | 5/2017 |

(Continued)

OTHER PUBLICATIONS

First Office Action of Chinese Application No. 202010038028.X, dated Jun. 1, 2021.

(Continued)

*Primary Examiner* — Arun C Williams
(74) *Attorney, Agent, or Firm* — Finnegan, Henderson, Farabow, Garrett & Dunner, L.L.P.

(57) ABSTRACT

A charging method includes: obtaining a first temperature at a preset position on an electronic device when constant-current charging is performed on a battery of the electronic device at a first constant current; in response to that the first temperature exceeds a preset first temperature threshold, obtaining a first voltage currently present at a designated position in the electronic device, and obtaining a second constant current preset in the electronic device; performing first constant-voltage charging on the battery at the first voltage until a charging current during the first constant-voltage charging is changed to the second constant current; and performing the constant-current charging on the battery at the second constant current.

18 Claims, 15 Drawing Sheets

(56) References Cited

U.S. PATENT DOCUMENTS

2018/0241098 A1\* 8/2018 Kang ................. H01M 10/48
2020/0373779 A1\* 11/2020 Arizono ............... H02J 7/0048

FOREIGN PATENT DOCUMENTS

| | | |
|---|---|---|
| CN | 107248763 A | 10/2017 |
| CN | 104578372 B | 4/2018 |
| CN | 108110854 A | 6/2018 |
| CN | 108767909 A | 11/2018 |
| CN | 109560335 A | 4/2019 |
| EP | 1 826 863 A2 | 8/2007 |
| JP | 2002010514 A | 1/2002 |
| JP | 2009033843 A | 2/2009 |
| JP | 2009201282 A | 9/2009 |
| JP | 2019022429 A | 2/2019 |
| JP | 2019140029 A | 8/2019 |
| KR | 20180074050 A | 7/2018 |

OTHER PUBLICATIONS

First Office Action of Indian Application No. 202044025570, dated Jul. 26, 2021.
Extended European Search Report in European Application No. 20184219.2, dated Sep. 28, 2020.

\* cited by examiner

CHARGING METHOD AND DEVICE, ELECTRONIC DEVICE AND STORAGE MEDIUM

CROSS-REFERENCE TO RELATED APPLICATION

The present application is based upon and claims priority to Chinese Patent Application No. 202010038028.X filed on Jan. 14, 2020, the content of which is hereby incorporated by reference in its entirety.

TECHNICAL FIELD

The disclosure relates to the technical field of charging, and particularly to a charging method and device, an electronic device and a storage medium.

BACKGROUND

Conventionally, with the application of fast charging technology, a temperature on a surface of an electronic device, such as a smart phone, may rise when the electronic device is charged. An excessively high temperature not only impairs performance of semiconductor devices in the electronic device, which makes the electronic device slow to respond, but also makes a user's hand feel hot when the user holds the electronic device, thus degrading the user's experience of using the electronic device.

In related technologies, the electronic device is subjected to temperature control when charged. The temperature-controlling strategies include a stair strategy, a cliff strategy and a pulse strategy that are adopted to keep the temperature on the surface of the electronic device below, e.g., 39 degrees centigrade.

The above temperature-controlling strategies have in common that when the temperature on the surface of the electronic device rises to an upper limit during a charging process, a current for controlling the temperature is changed from a constant current I1 to another constant current I2. At this time, the temperature on the surface of the electronic device may fall for a while and then rise to a temperature corresponding to the constant current I2. The above phenomenon may be referred to as loss of heat capacity. In case of the loss of heat capacity, an excessive adjustment of the constant current may result in a longer time spent in charging, thus user experience in the charging may be degraded.

SUMMARY

According to a first aspect of embodiments of the disclosure, a charging method applied to an electronic device including a battery, includes: obtaining a first temperature at a preset position on the electronic device when constant-current charging is performed on the battery at a first constant current; in response to that the first temperature exceeds a preset first temperature threshold, obtaining a first voltage currently present at a designated position in the electronic device, and obtaining a second constant current preset in the electronic device; performing first constant-voltage charging on the battery at the first voltage until a charging current during the first constant-voltage charging is changed to the second constant current; and performing the constant-current charging on the battery at the second constant current.

According to a second aspect of embodiments of the disclosure, an electronic device includes: a battery; a processor; and a memory configured to store instructions executable by the processor. The processor is configured to: obtain a first temperature at a preset position on the electronic device when constant-current charging is performed on the battery at a first constant current; in response to that the first temperature exceeds a preset first temperature threshold, obtain a first voltage currently present at a designated position in the electronic device, and obtain a second constant current preset in the electronic device; perform first constant-voltage charging on the battery at the first voltage until a charging current during the first constant-voltage charging is changed to the second constant current; and perform the constant-current charging on the battery at the second constant current.

According to a third aspect of embodiments of the disclosure, a non-transitory computer-readable storage medium has stored thereon instruction that, when executed by a processor of an electronic device, cause the electronic device to perform a charging method, the method including: obtaining a first temperature at a preset position on the electronic device when constant-current charging is performed on the battery at a first constant current; in response to that the first temperature exceeds a preset first temperature threshold, obtaining a first voltage currently present at a designated position in the electronic device, and obtaining a second constant current preset in the electronic device; performing first constant-voltage charging on the battery at the first voltage until a charging current during the first constant-voltage charging is changed to the second constant current; and performing the constant-current charging on the battery at the second constant current.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices consistent with aspects related to the present disclosure as recited in the appended claims.

Figure 1:
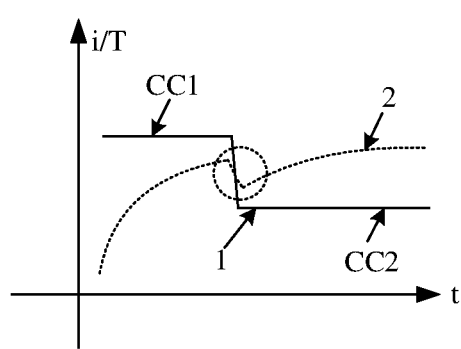
FIG. 1 is a diagram illustrating temperature control in constant current-constant current (CC-CC) charging in related technologies.

FIG. 1 a diagram illustrating temperature control in constant current-constant current (CC-CC) charging in related technologies. FIG. 1 shows a curve 1 of a current change in a switch from first constant-current charging (CC1) to second constant-current charging (CC2) and a curve 2 of an electronic device's temperature change in the switch. The loss of heat capacity, as described in the Background, occurs in a dotted circle in FIG. 1. In case of the loss of heat capacity, an excessive adjustment of the constant current may result in a longer time spent in charging, thus user experience in the charging may be degraded.

To solve the above problem, a charging method is provided in embodiments of the disclosure. In the charging method, when it is detected, during a constant-current charging at a first constant current, that temperature control needs to be performed on the electronic device, the constant-current charging is switched to a constant-voltage charging, so that the charging current can be changed to a second constant current slowly and then the charging is performed at the second constant current. As a result, in the embodiments of the disclosure, an average charging current can be increased, which is beneficial to reducing the time spent in charging. Moreover, in the embodiments of the disclosure, the temperature curve can be made relatively smooth to avoid the loss of heat capacity.

Figure 2:
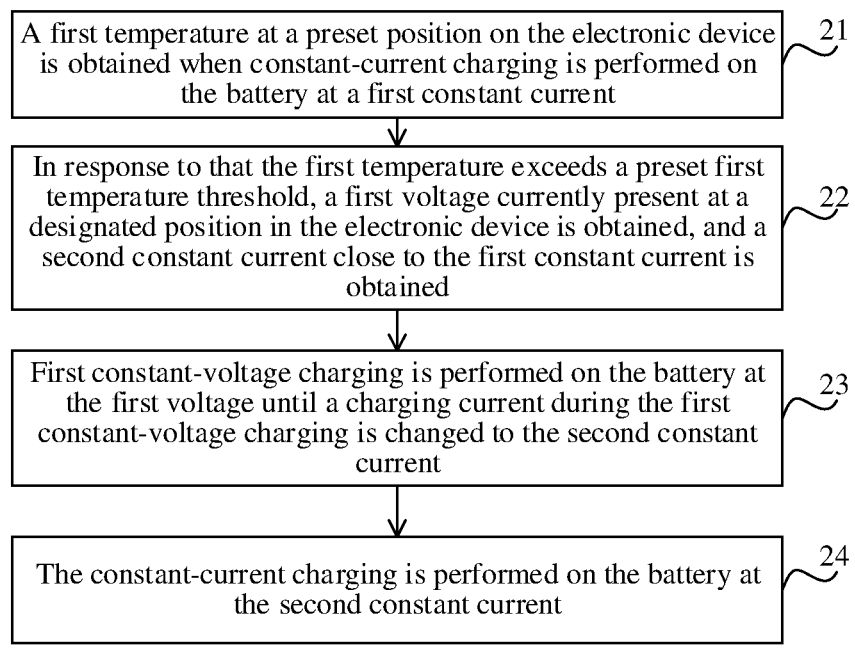
FIG. 2 is a flowchart of a charging method according to an exemplary embodiment of the disclosure.

FIG. 2 is a flowchart of a charging method according to an exemplary embodiment of the disclosure. As illustrated in FIG. 2, the charging method may be applied to an electronic device including a battery, and the method includes the following operations.

In operation 21, a first temperature at a preset position on the electronic device is obtained when constant-current charging is performed on the battery at a first constant current.

The electronic device may be charged in a wireless or wired manner. As the battery runs low (for example, the battery level is between 0 to 30%) in the early stage of the charging, the constant-current charging may be performed at a high current I1 in the stage. The high current I1 is referred to as the first constant current hereinafter.

It can be understood that when the charging is performed at the first constant current, a higher charging current results in a higher speed of heat generation, that is to say, much heat is generated in the battery in a short time. In this way, the temperature of the electronic device is also increased. If a temperature at an outer covering of the electronic device exceeds an ambient temperature, a user's hand may feel hot when the user picks up the electronic device.

In the embodiment of the disclosure, a temperature sensor is provided in the electronic device to detect a temperature at a preset position in real time or periodically, so that a processor of the electronic device can obtain the above temperature. When the electronic device includes a one-sided display screen, the preset position may be a top of a rear covering of the electronic device. When the electronic device includes a two-sided display screen, the preset position may be a top of a secondary display screen of the electronic device. For illustrative purposes, the temperature detected during the first constant-current charging is referred to hereafter as a first temperature.

In operation 22, in response to that the first temperature exceeds a preset first temperature threshold, a first voltage currently present at a designated position in the electronic device is obtained, and a second constant current next to the first constant current is obtained. For example, multiple constant currents, including the first constant current, the second constant current, etc., may be preset, e.g., stored, in the electronic device, and sequentially be obtained from the electronic device for use.

The preset first temperature threshold may be, for example, between 36 and 39 degrees centigrade and be changeable, and may be stored in the electronic device. After the first temperature is obtained, the electronic device may compare the first temperature with the first temperature threshold. In response to that the first temperature is less than the first temperature threshold, the electronic device may be charged in the same manner, that is to say, the battery continues to be subjected to the constant-current charging at the first constant current, and operation 21 is to be performed again. In response to that the first temperature exceeds the first temperature threshold, the electronic device may obtain a voltage currently present at the designated position in the electronic device. The voltage, which is obtained at the designated position in response to that the first temperature exceeds the first temperature threshold, is referred to hereafter as a first voltage.

The designated position may include at least one of: a positive end of a cell (i.e., a cell point) in the battery or a voltage detection point (i.e., a pack point) on a mainboard circuit in the electronic device. A protection circuit for the battery, in the form of a flexible print circuit (FPC), may be arranged between the voltage detection point and the positive end of the cell.

In an embodiment, a sense line on a main charger or a pump charger in the electronic device is electrically connected to the designated position, so that a voltage present at the designated position may be detected. Then the voltage is reported by the main charger or the pump charger to the processor of the electronic device so that the processor can obtain the first voltage.

In an embodiment, a charging strategy may be stored in the electronic device in advance and may include a constant-current charging strategy that may involve multiple constant currents such as the first constant current I1, a second constant current I2, and a third constant current I3. For example, three constant currents, namely the first constant current I1, the second constant current I2, and the third constant current I3 (I1>I2>I3), are set in the strategy. The first constant current I1, the second constant current I2, and the third constant current I3 may be preset, e.g., prestored, in the electronic device, and sequentially be obtained from the electronic device for use. Also for example, a current difference between the first constant current I1 and the second constant current I2 is Delta I12, and a current difference between the second constant current I2 and the third constant current I3 is Delta I23. Delta I12 may be equal to Delta I23 (e.g., each is 200 mA). Alternatively, Delta I12 may be different from Delta I23. When they are different, Delta I12 may be set as 200 mA and Delta I23 may be set as 300 mA. Therefore, with an increase in the charging duration, the reduction in the current can be sped up so as to ensure the safety in the charging.

In response to the first temperature exceeds the preset first temperature threshold, the electronic device may obtain a current (namely the first constant current) at which the constant-current charging is currently performed, and obtain, from the constant-current charging strategy, the second constant current next to the first constant current. It can be understood that the second constant current is less than the first constant current since the temperature of the electronic device needs to be reduced.

In operation 23, first constant-voltage charging is performed on the battery at the first voltage until a charging current during the first constant-voltage charging is changed to the second constant current.

The electronic device may perform the constant-voltage charging on the battery at the first voltage, which is referred to hereafter as the first constant-voltage charging. It can be understood that during the first constant-voltage charging, the charging current gradually reduces from the first constant current I1 to the second constant current. For example, the charging current is successively equal to 600 mA, 400 mA, 200 mA or the like during its reduction.

Figure 3:
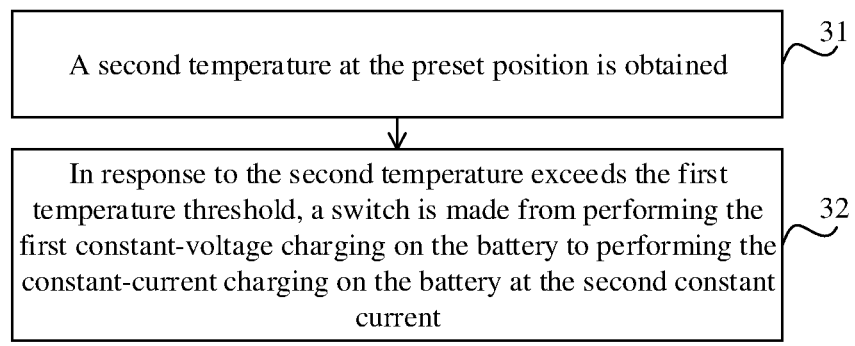
FIG. 3 is a flowchart of a charging method according to an exemplary embodiment of the disclosure.

During the first constant-voltage charging, the temperature sensor in the electronic device may continue to detect the temperature at the preset position, which is referred to as a second temperature hereinafter. FIG. 3 is a flowchart of a charging method according to an exemplary embodiment. As illustrated in FIG. 3, in operation 31 the electronic device may obtain the second temperature at the preset position. The electronic device may compare the second temperature with the first temperature threshold, which theoretically may lead to three results: the second temperature is less than the first temperature threshold; the second temperature is equal to the first temperature threshold; the second temperature is greater than the first temperature threshold. A scenario where the second temperature is less than or equal to the first temperature threshold is a desired scenario. In operation 32, in response to the second temperature exceeds (is greater than or equal to) the first temperature threshold, a switch is made from performing the first constant-voltage charging on the battery to performing the constant-current charging on the battery at the second constant current. In this way, the reduction in the temperature of the electronic device may be sped up and temperature control may be achieved. In response to that the second temperature is less than the first temperature threshold, the battery may continue to be charged at the first constant voltage.

Figure 4:
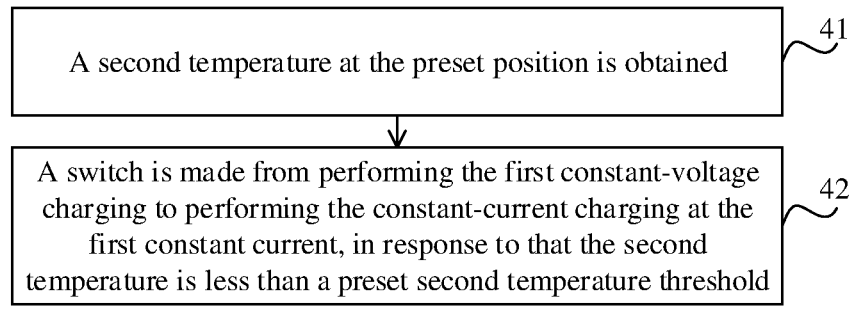
FIG. 4 is a flowchart of a charging method according to an exemplary embodiment of the disclosure.

It can be understood that the above first temperature threshold can be used as an upper threshold of the temperature. In some embodiments, a lower threshold, referred to hereafter as a second temperature threshold, may be set. For example, the second temperature threshold may be between 33 to 35 degrees centigrade. FIG. 4 is a flowchart of a charging method according to an exemplary embodiment. As illustrated in FIG. 4, in operation 41, the electronic device may obtain the second temperature at the preset position. The electronic device may compare the second temperature with the second temperature threshold, which theoretically may lead to three results: the second temperature is less than the second temperature threshold; the second temperature is equal to the second temperature threshold; and the second temperature is greater than the second temperature threshold. A scenario where the second temperature is greater than the second temperature threshold is a desired scenario. In operation 42, a switch is made from performing the first constant-voltage charging to performing the constant-current charging at the first constant current, in response to that the second temperature is less than the preset second temperature threshold. From a determination that the second temperature is less than the preset second temperature threshold, it can be determined that the temperature drops excessively rapid. As the excessively rapid drop in temperature decreases a charging efficiency, a switch to the first constant-current charging facilitates temperature control while ensuring the charging efficiency.

Referring back to FIG. 2, in operation 24, the constant-current charging is performed on the battery at the second constant current.

Figure 5:
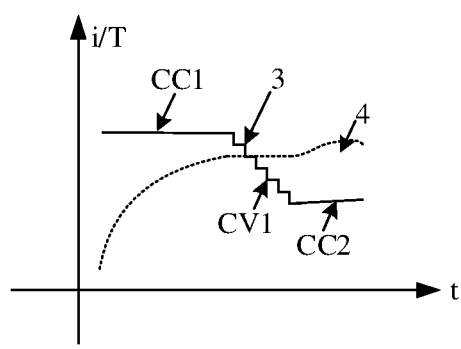
FIG. 5 is a diagram illustrating a curve of a charging current and a curve of a temperature change according to an exemplary embodiment.

When the electronic device detects that the second constant current is the charging current, the constant-current charging is performed on the battery at the second constant current. FIG. 5 illustrates a current change curve 3 and a curve 4 of the electronic device's temperature change according to an exemplary embodiment. In this embodiment, the CC1 is performed, then the first constant-voltage charging (CV1) is performed, and finally the CC2 is performed, thereby preventing the loss of heat capacity.

In the above embodiments, each temperature threshold corresponds to a scenario in which an upper limit is set. In some embodiments, multiple upper limits such as the first temperature threshold, a third temperature threshold and a fourth temperature threshold may be set.

For example, three upper limits, namely the first temperature threshold, the third temperature threshold and the fourth temperature threshold are set, where the first temperature threshold may be 36 degrees centigrade, the third temperature threshold may be 38 degrees centigrade and the fourth temperature threshold may be 39 degrees centigrade.

Figure 6:
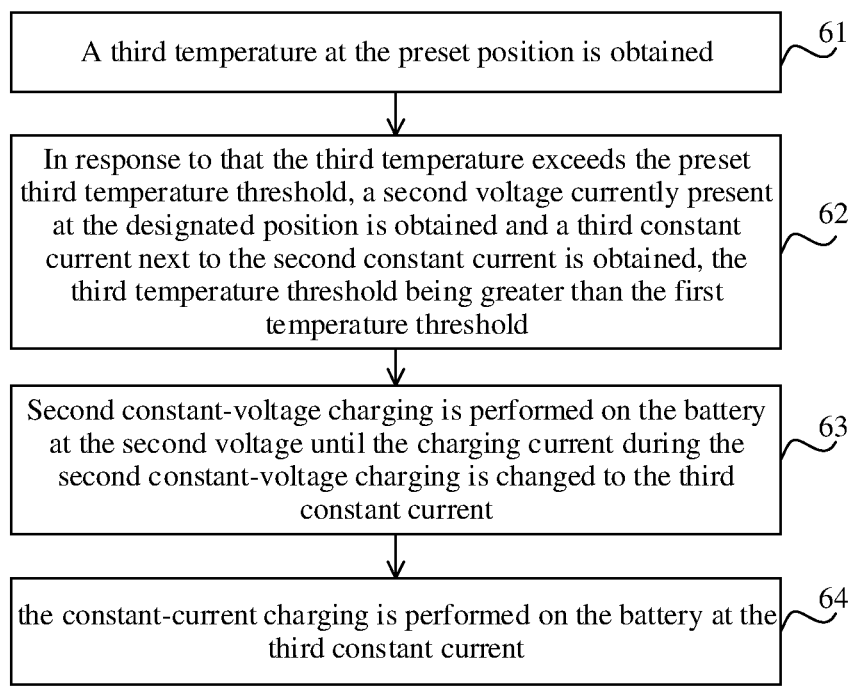
FIG. 6 is a flowchart of a charging method according to an exemplary embodiment of the disclosure.

FIG. 6 is a flowchart of a charging method according to an exemplary embodiment of the disclosure. As illustrated in FIG. 6, in operation 61, after the constant-current charging is performed on the battery at the second constant current, the electronic device may obtain a third temperature at the preset position. In operation 62, the electronic device may compare the third temperature and the preset third temperature threshold; and in response to that the third temperature exceeds the preset third temperature threshold, the electronic device obtains a second voltage currently present at the designated position and obtains a third constant current next to the second constant current. The third temperature threshold is greater than the first temperature threshold and the third constant current is less than the second constant current. In response to that the third temperature is less than the third temperature threshold, the second constant-current charging may continue to be performed on the battery. In operation 63, the electronic device performs second constant-voltage charging on the battery at the second voltage until the charging current during the second constant-voltage charging is changed to the third constant current. In operation 64, the electronic device may perform the constant-current charging on the battery at the third constant current.

Figure 7:
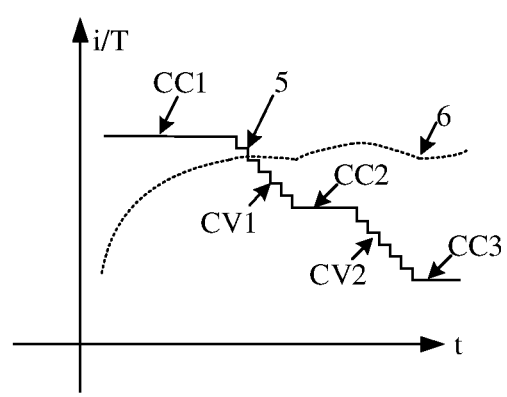
FIG. 7 is a diagram illustrating a curve of a charging current and a curve of a temperature change according to an exemplary embodiment.

FIG. 7 illustrates a current change curve 5 and a temperature change curve 6 that are based on the embodiment illustrated in FIG. 6. In FIG. 7 after the CC1, the CV1, the CC2, the second constant-voltage charging (CV2) and third constant-current charging (CC3) are successively performed, the temperature of the electronic device is in a state of a slow fluctuation. Therefore, the temperature is under control and good charging efficiency is achieved.

Figure 8:
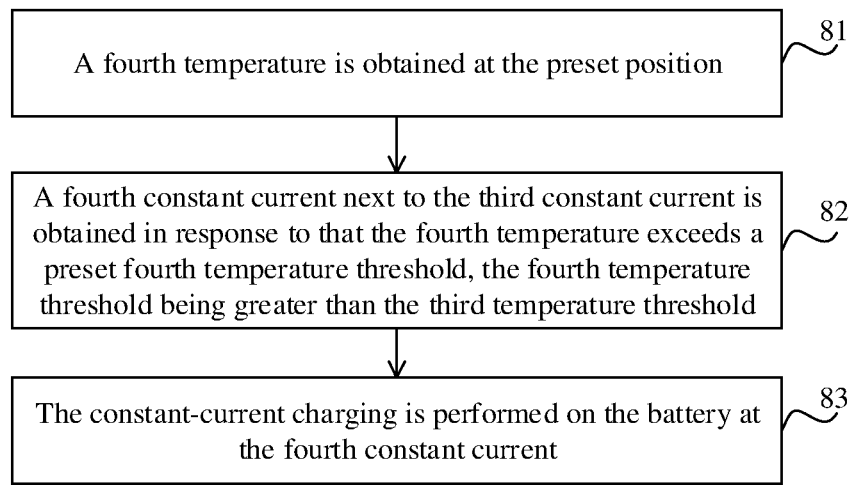
FIG. 8 is a flowchart of a charging method according to an exemplary embodiment of the disclosure.

FIG. 8 is a flowchart of a charging method according to an exemplary embodiment of the disclosure. As illustrated in FIG. 8, in operation 81, after the constant-current charging is performed on the battery at the third constant current, the electronic device may obtain a fourth temperature at the preset position. In operation 82, the electronic device may compare the fourth temperature and a preset fourth temperature threshold that is greater than the third temperature threshold. In response to that the fourth temperature exceeds the preset fourth temperature threshold, a fourth constant current next to the third constant current is obtained. In operation 83, the electronic device may perform the constant-current charging on the battery at the fourth constant current.

Figure 9:
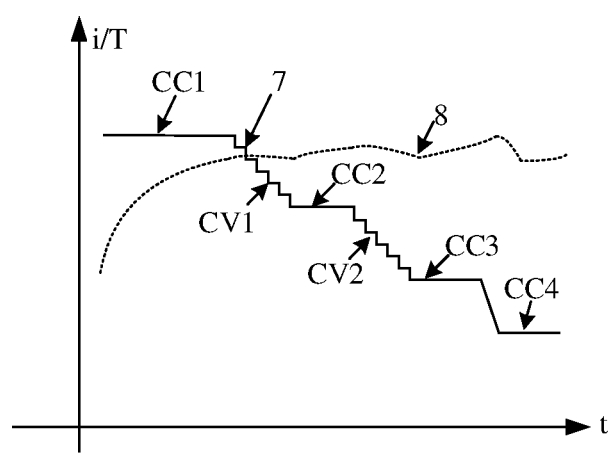
FIG. 9 is a diagram illustrating a curve of a charging current and a curve of a temperature change according to an exemplary embodiment.

FIG. 9 illustrates a current change curve 7 and a temperature change curve 8 based on the embodiment illustrated in FIG. 8. In FIG. 9, after the CC1, the CV1, the CC2, the CV2, the CC3 and the fourth constant-current charging (CC4) are successively performed, the temperature of the electronic device is in the state of the slow fluctuation and finally drops rapidly. In this way, the temperature is under control and the good charging efficiency is guaranteed.

Three temperature thresholds (upper limits) are set in the scenarios of the embodiments illustrated in FIG. 6 to FIG. 9. A charging manner CC+CV+CC is adopted in response to that the first temperature threshold or the third temperature threshold is exceeded, and a charging manner CC+CC is adopted (or the electricity in the electronic device is cut off) in response to that the fourth temperature threshold is exceeded. Alternatively, in response to that the first temperature threshold is exceeded, the charging manner CC+CV+CC is adopted, and in response to that the third temperature threshold or the fourth temperature threshold is exceeded, the charging manner CC+CC is adopted (or the electricity in the electronic device is cut off). Alternatively, in response to that the first temperature threshold is exceeded, the charging manner CC+CC is adopted, and in response to that the third temperature threshold or the fourth temperature threshold is exceeded, the charging manner CC+CV+CC is adopted. In this way, control of the electronic device's temperature implemented with corresponding schemes falls in the scope of the present disclosure.

Thus, in the embodiments of the disclosure, by adding the first constant-voltage charging between a first constant-current charging and a second constant-current charging, the first constant-current can be adjusted slowly to the second constant-current for charging, and thus it can increase an average charging current and facilitate reduction in the time spent in charging. Moreover, the temperature curve may be made relatively smooth to avoid the loss of heat capacity.

Figure 10:
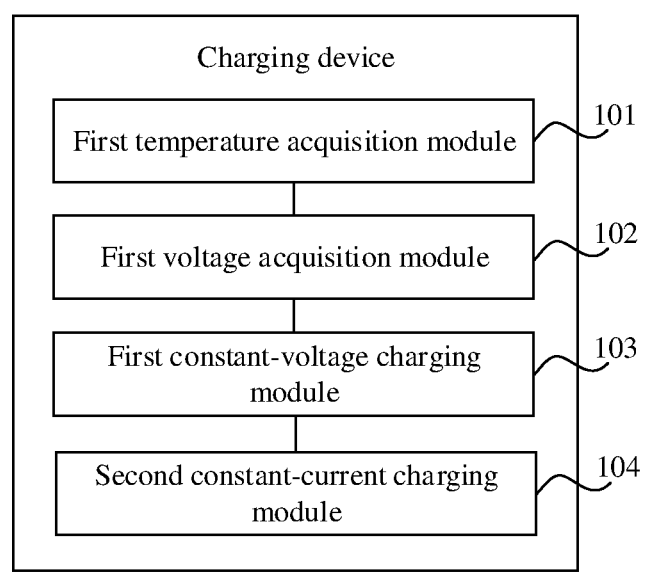
FIG. 10 to FIG. 14 are block diagrams of a charging device according to exemplary embodiments of the disclosure.

A charging device is also provided in the embodiments of the disclosure based on the above charging method. FIG. 10 is a block diagram illustrating the charging device according to an exemplary embodiment of the disclosure. As illustrated in FIG. 10, the charging device includes: a first temperature acquisition module 101, configured to obtain a first temperature at a preset position on the electronic device when constant-current charging is performed on the battery at a first constant current; a first voltage acquisition module 102, configured to, in response to that the first temperature exceeds a preset first temperature threshold, obtain a first voltage currently present at a designated position in the electronic device, and obtain a second constant current next to the first constant current; a first constant-voltage charging module 103, configured to perform first constant-voltage charging on the battery at the first voltage until a charging current during the first constant-voltage charging is changed to the second constant current; and a second constant-current charging module 104, configured to perform the constant-current charging on the battery at the second constant current.

Figure 11:
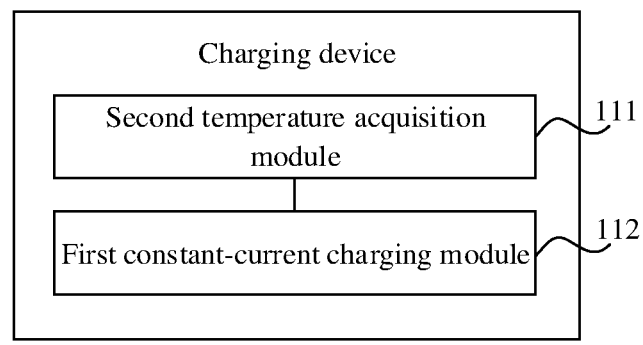

As illustrated in FIG. 11, in an embodiment, the device further includes: a second temperature acquisition module 111, configured to obtain a second temperature at the preset position; and a first constant-current charging module 112, configured to switch from performing the first constant-voltage charging to performing the constant-current charging at the first constant current, in response to that the second temperature is less than a preset second temperature threshold.

Figure 12:
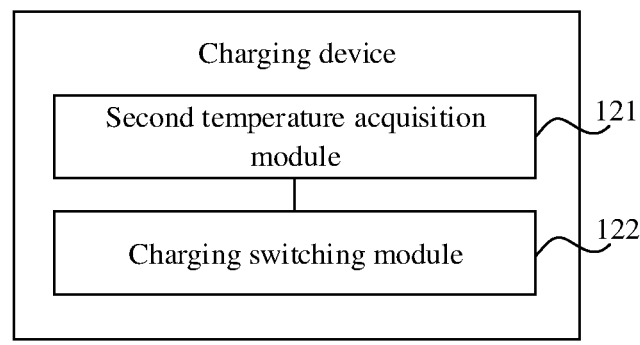

As illustrated in FIG. 12, in an embodiment, the device further includes: a second temperature acquisition module 121, configured to obtain a second temperature at the preset position; and a charging switching module 122, configured to switch from performing the first constant-voltage charging on the battery to performing the constant-current charging on the battery at the second constant current, in response to that the second temperature exceeds the preset first temperature threshold.

Figure 13:
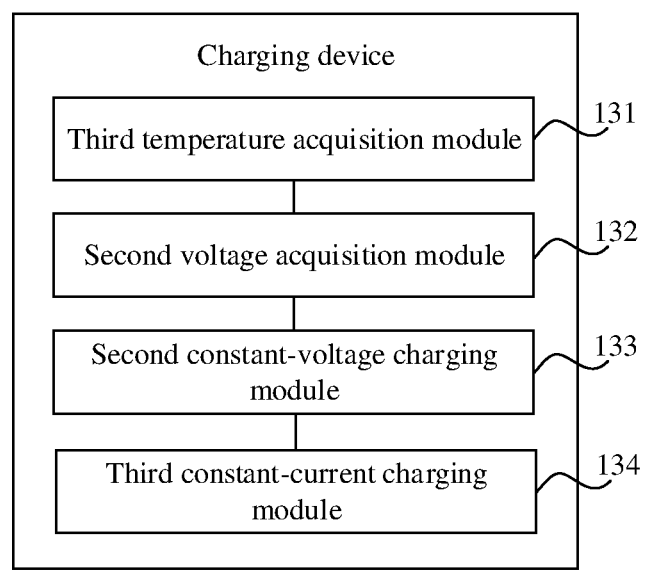

As illustrated in FIG. 13, in an embodiment, the device further includes: a third temperature acquisition module 131, configured to obtain a third temperature at the preset position; a second voltage acquisition module 132, configured to, in response to that the third temperature exceeds a preset third temperature threshold, obtain a second voltage currently present at the designated position, and obtain a third constant current next to the second constant current, the third temperature threshold being greater than the first temperature threshold; a second constant-voltage charging module 133, configured to perform second constant-voltage charging on the battery at the second voltage until the charging current during the second constant-voltage charging is changed to the third constant current; and a third constant-current charging module 134, configured to perform the constant-current charging on the battery at the third constant current.

Figure 14:
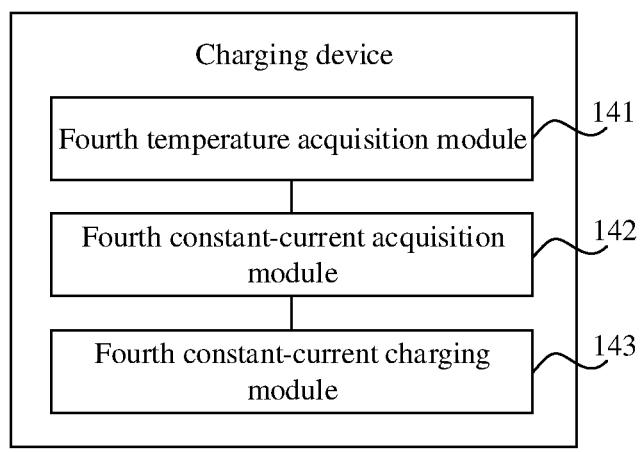

As illustrated in FIG. 14, in an embodiment, the device further includes: a fourth temperature acquisition module 141, configured to obtain a fourth temperature at the preset position; a fourth constant-current acquisition module 142, configured to obtain a fourth constant current next to the third constant current in response to that the fourth temperature exceeds a preset fourth temperature threshold, the fourth temperature threshold being greater than the third temperature threshold; and a fourth constant-current charging module 143, configured to perform the constant-current charging on the battery at the fourth constant current.

In an embodiment, the designated position includes at least one of: a positive end of a cell in the battery or a voltage detection point on a mainboard circuit in the electronic device, wherein a protection circuit for the battery is arranged between the voltage detection point and the positive end of the cell.

The above device embodiments correspond to the method embodiments, which may be referred to for detailed operations of the device.

In the embodiments of the disclosure, by adding the first constant-voltage charging between a first constant-current charging and a second constant-current charging, the first constant-current can be adjusted slowly to the second constant-current for charging, and thus it can increase an average charging current and facilitate reduction in the time spent in charging. Moreover, the temperature curve may be made relatively smooth to avoid the loss of the heat capacity.

Figure 15:
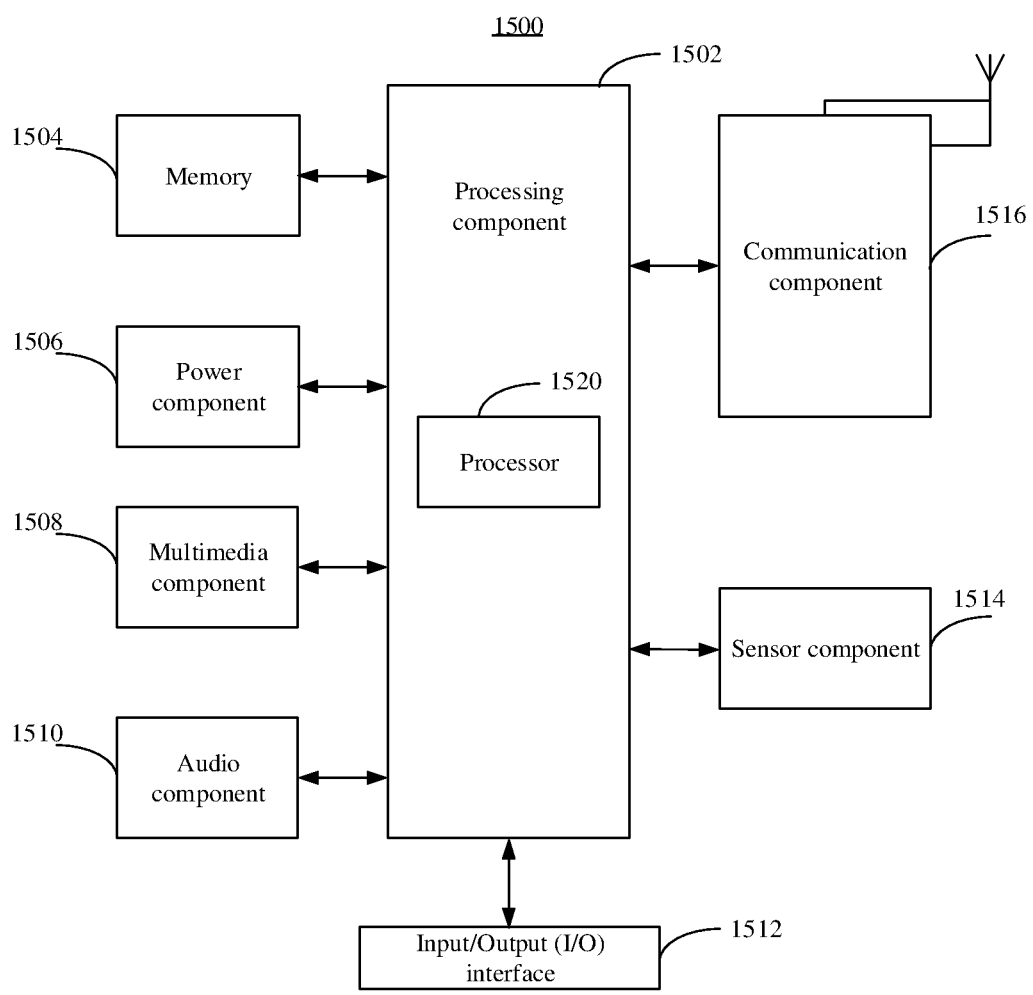
FIG. 15 is a block diagram of an electronic device according to an embodiment of the disclosure.

FIG. 15 is a block diagram illustrating an electronic device 1500 according to an exemplary embodiment of the disclosure. For example, the electronic device 1500 may be a smart phone, a computer, a digital broadcast terminal, a tablet, a medical device, exercise equipment, a personal digital assistant or the like.

As illustrated in FIG. 15, the electronic device 1500 may include one or more of the following components: a processing component 1502, a memory 1504, a power component 1506, a multimedia component 1508, an audio component 1510, an Input/Output (I/O) interface 1512, a sensor component 1514, a communication component 1516, and an image capturing component 1518.

The processing component 1502 typically controls overall operations of the electronic device 1500, such as the operations associated with display, telephone calls, data communications, camera operations, and recording operations. The processing component 1502 may include one or more processors 1520 to execute instructions. Moreover, the processing component 1502 may include one or more modules which facilitate interaction between the processing component 1502 and the other components. For instance, the processing component 1502 may include a multimedia module to facilitate interaction between the multimedia component 1508 and the processing component 1502.

The memory 1504 is configured to store various types of data to support the operation of the electronic device 1500. Examples of such data include instructions for any application programs or methods operated on the electronic device 1500, contact data, phonebook data, messages, pictures, video, etc. The memory 1504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1506 provides power for various components of the electronic device 1500. The power component 1506 may include a power management system, one or more power supplies, and other components associated with generation, management and distribution of power for the electronic device 1500. For example, the power component 1506 may include a Power Management Integrated Circuit (PMIC) that can serve as a conversion circuit in a Universal Serial Bus (USB) Type-C interface module to compare a real-time voltage with a preset voltage threshold. The PMIC generates a triggering signal and outputs the signal to a processor when the real-time voltage is less than the voltage threshold so that the processor transmits a controlling signal to a USB Type-C Configuration Channel (CC) pin or transmits a controlling instruction to the PMIC for instructing the PMIC to transmit a controlling signal to the CC pin.

The multimedia component 1508 includes a screen providing an output interface between the electronic device 1500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action.

The audio component 1510 is configured to output and/or input an audio signal. For example, the audio component 1510 includes a Microphone (MIC), and the MIC is configured to receive an external audio signal when the electronic device 1500 is in an operation mode, such as a call mode, a recording mode and a voice recognition mode. The received audio signal may further be stored in the memory 1504 or sent through the communication component 1516. In some embodiments, the audio component 1510 further includes a speaker configured to output the audio signal.

The I/O interface 1512 provides an interface between the processing component 1502 and a peripheral interface module, and the peripheral interface module may be a keyboard, a click wheel, a button and the like.

The sensor component 1514 includes one or more sensors configured to provide status assessment in various aspects for the electronic device 1500. For instance, the sensor component 1514 may detect an on/off status of the electronic device 1500 and relative positioning of components, such as a display and small keyboard of the electronic device 1500, and the sensor component 1514 may further detect a change in a position of the electronic device 1500 or a component of the electronic device 1500, presence or absence of contact between a target object and the electronic device 1500, orientation or acceleration/deceleration of the electronic device 1500 and a change in temperature of the electronic device 1500.

The communication component 1516 is configured to facilitate wired or wireless communication between the electronic device 1500 and another device. The electronic device 1500 may access a communication-standard-based wireless network, such as a Wireless Fidelity (WiFi) network, a 4th-Generation (4G) or 5th-Generation (5G) network or a combination thereof. In an exemplary embodiment, the communication component 1516 receives a broadcast signal or broadcast associated information from an external broadcast management system through a broadcast channel. In an exemplary embodiment, the communication component 1516 further includes a Near Field Communication (NFC) module to facilitate short-range communication. In an exemplary embodiment, the communication component 1516 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the electronic device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

In an exemplary embodiment, there is also provided a non-transitory readable storage medium including an executable instruction, such as the memory 1504 including an instruction, and the executable instruction may be executed by the processor 1520 of the electronic device 1500 to perform the above described methods. The readable storage medium may be a Read-Only Memory (ROM), a Random Access Memory (RAM), a Compact Disc Read-Only Memory (CD-ROM), a magnetic tape, a floppy disc, an optical data storage device and the like.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be appreciated that the present disclosure is not limited to the exact construction that has been described above and illustrated in the accompanying drawings, and that various modifications and changes may be made without departing from the scope thereof. It is intended that the scope of the present disclosure only be limited by the appended claim.

What is claimed is:

1. A charging method, applied to an electronic device comprising a battery, the method comprising:
   obtaining a first temperature at a preset position on the electronic device when constant-current charging is performed on the battery at a first constant current;
   in response to that the first temperature exceeds a preset first temperature threshold, obtaining a first voltage currently present at a designated position in the electronic device, and obtaining a second constant current preset in the electronic device;
   performing first constant-voltage charging on the battery at the first voltage until a charging current during the first constant-voltage charging is changed to the second constant current; and
   performing the constant-current charging on the battery at the second constant current.

2. The charging method of claim 1, after performing the first constant-voltage charging on the battery at the first voltage, further comprising:
   obtaining a second temperature at the preset position; and
   switching from performing the first constant-voltage charging to performing the constant-current charging at the first constant current, in response to that the second temperature is less than a preset second temperature threshold.

3. The charging method of claim 1, after performing the first constant-voltage charging on the battery at the first voltage, further comprising:
   obtaining a second temperature at the preset position; and
   switching from performing the first constant-voltage charging on the battery to performing the constant-current charging on the battery at the second constant current, in response to that the second temperature exceeds the preset first temperature threshold.

4. The charging method of claim 3, after switching from performing the first constant-voltage charging on the battery to performing the constant-current charging on the battery at the second constant current, further comprising:
   obtaining a third temperature at the preset position;
   in response to that the third temperature exceeds a preset third temperature threshold, obtaining a second voltage currently present at the designated position, and obtaining a third constant current preset in the electronic device, the third temperature threshold being greater than the first temperature threshold;
   performing second constant-voltage charging on the battery at the second voltage until the charging current during the second constant-voltage charging is changed to the third constant current; and
   performing the constant-current charging on the battery at the third constant current.

5. The charging method of claim 4, after performing the constant-current charging on the battery at the third constant current, further comprising:
   obtaining a fourth temperature at the preset position;
   obtaining a fourth constant current preset in the electronic device in response to that the fourth temperature exceeds a preset fourth temperature threshold, the fourth temperature threshold being greater than the third temperature threshold; and
   performing the constant-current charging on the battery at the fourth constant current.

6. The charging method of claim 1, wherein the designated position comprises at least one of: a positive end of a cell in the battery or a voltage detection point on a mainboard circuit in the electronic device, wherein a protection circuit for the battery is arranged between the voltage detection point and the positive end of the cell.

7. An electronic device, comprising:
   a battery;
   a processor; and
   a memory configured to store instructions executable by the processor,
   wherein the processor is configured to:
   obtain a first temperature at a preset position on the electronic device when constant-current charging is performed on the battery at a first constant current;
   in response to that the first temperature exceeds a preset first temperature threshold, obtain a first voltage currently present at a designated position in the electronic device, and obtain a second constant current preset in the electronic device;
   perform first constant-voltage charging on the battery at the first voltage until a charging current during the first constant-voltage charging is changed to the second constant current; and
   perform the constant-current charging on the battery at the second constant current.

8. The electronic device of claim 7, wherein after performing the first constant-voltage charging on the battery at the first voltage, the processor is further configured to:
   obtain a second temperature at the preset position; and
   switch from performing the first constant-voltage charging to performing the constant-current charging at the first constant current, in response to that the second temperature is less than a preset second temperature threshold.

9. The electronic device of claim 7, wherein after performing the first constant-voltage charging on the battery at the first voltage, the processor is further configured to:
   obtain a second temperature at the preset position; and
   switch from performing the first constant-voltage charging on the battery to performing the constant-current charging on the battery at the second constant current, in response to that the second temperature exceeds the preset first temperature threshold.

10. The electronic device of claim 9, wherein after switching from performing the first constant-voltage charging on the battery to performing the constant-current charging on the battery at the second constant current, the processor is further configured to:
    obtain a third temperature at the preset position;
    in response to that the third temperature exceeds a preset third temperature threshold, obtain a second voltage currently present at the designated position, and obtain a third constant current preset in the electronic device, the third temperature threshold being greater than the first temperature threshold;

perform second constant-voltage charging on the battery at the second voltage until the charging current during the second constant-voltage charging is changed to the third constant current; and perform the constant-current charging on the battery at the third constant current.

11. The electronic device according to claim 10, wherein after performing the constant-current charging on the battery at the third constant current, the processor is further configured to:

obtain a fourth temperature at the preset position;

obtain a fourth constant current preset in the electronic device in response to that the fourth temperature exceeds a preset fourth temperature threshold, the fourth temperature threshold being greater than the third temperature threshold; and perform the constant-current charging on the battery at the fourth constant current.

12. The electronic device of claim 7, wherein the designated position comprises at least one of: a positive end of a cell in the battery or a voltage detection point on a mainboard circuit in the electronic device, wherein a protection circuit for the battery is arranged between the voltage detection point and the positive end of the cell.

13. A non-transitory computer-readable storage medium having stored thereon instructions that, when executed by a processor of an electronic device, cause the electronic device to perform a charging method, the method comprising:

obtaining a first temperature at a preset position on the electronic device when constant-current charging is performed on a battery of the electronic device at a first constant current;

in response to that the first temperature exceeds a preset first temperature threshold, obtaining a first voltage currently present at a designated position in the electronic device, and obtaining a second constant current preset in the electronic device;

performing first constant-voltage charging on the battery at the first voltage until a charging current during the first constant-voltage charging is changed to the second constant current; and performing the constant-current charging on the battery at the second constant current.

14. The non-transitory computer-readable storage medium of claim 13, wherein after performing the first constant-voltage charging on the battery at the first voltage, the method further comprises:

obtaining a second temperature at the preset position; and switching from performing the first constant-voltage charging to performing the constant-current charging at the first constant current, in response to that the second temperature is less than a preset second temperature threshold.

15. The non-transitory computer-readable storage medium of claim 13, wherein after performing the first constant-voltage charging on the battery at the first voltage, the method further comprises:

obtaining a second temperature at the preset position; and switching from performing the first constant-voltage charging on the battery to performing the constant-current charging on the battery at the second constant current, in response to that the second temperature exceeds the preset first temperature threshold.

16. The non-transitory computer-readable storage medium of claim 15, wherein after switching from performing the first constant-voltage charging on the battery to performing the constant-current charging on the battery at the second constant current, the method further comprises:

obtaining a third temperature at the preset position;

in response to that the third temperature exceeds a preset third temperature threshold, obtaining a second voltage currently present at the designated position, and obtaining a third constant current preset in the electronic device, the third temperature threshold being greater than the first temperature threshold;

performing second constant-voltage charging on the battery at the second voltage until the charging current during the second constant-voltage charging is changed to the third constant current; and performing the constant-current charging on the battery at the third constant current.

17. The non-transitory computer-readable storage medium of claim 16, wherein after performing the constant-current charging on the battery at the third constant current, the method further comprises:

obtaining a fourth temperature at the preset position;

obtaining a fourth constant current preset in the electronic device in response to that the fourth temperature exceeds a preset fourth temperature threshold, the fourth temperature threshold being greater than the third temperature threshold; and performing the constant-current charging on the battery at the fourth constant current.

18. The non-transitory computer-readable storage medium of claim 13, wherein the designated position comprises at least one of: a positive end of a cell in the battery or a voltage detection point on a mainboard circuit in the electronic device, wherein a protection circuit for the battery is arranged between the voltage detection point and the positive end of the cell.

* * * * *